United States Patent
Gil Cacho

(10) Patent No.: US 11,988,780 B2
(45) Date of Patent: May 21, 2024

(54) IMAGING DEVICE AND METHOD

(71) Applicant: Sony Semiconductor Solutions Corporation, Kanagawa (JP)

(72) Inventor: Pepe Gil Cacho, Belgium (DE)

(73) Assignee: Sony Semiconductor Solutions Corporation, Kanagawa (JP)

(*) Notice: Subject to any disclaimer, the term of this patent is extended or adjusted under 35 U.S.C. 154(b) by 64 days.

(21) Appl. No.: 17/053,749

(22) PCT Filed: May 7, 2019

(86) PCT No.: PCT/EP2019/061710
§ 371 (c)(1),
(2) Date: Nov. 6, 2020

(87) PCT Pub. No.: WO2019/215172
PCT Pub. Date: Nov. 14, 2019

(65) Prior Publication Data
US 2021/0231812 A1    Jul. 29, 2021

(30) Foreign Application Priority Data

May 9, 2018  (EP) ..................... 18171594

(51) Int. Cl.
*G01S 7/493*  (2006.01)
*G01B 11/22*  (2006.01)
(Continued)

(52) U.S. Cl.
CPC .............. *G01S 7/493* (2013.01); *G01B 11/22* (2013.01); *G01S 17/894* (2020.01); *G06T 5/20* (2013.01); *G06T 7/521* (2017.01)

(58) Field of Classification Search
CPC ........ G01S 7/493; G01S 17/894; G01S 17/89; G06T 7/521; G06T 5/20; G01B 11/22
See application file for complete search history.

(56) References Cited

U.S. PATENT DOCUMENTS

2013/0148102 A1* 6/2013 Oggier ................. G01S 7/4915
356/5.01
2014/0002445 A1    1/2014 Xiong
(Continued)

FOREIGN PATENT DOCUMENTS

EP          2 955 544 A1    12/2015
WO    WO 2015/133910 A3     1/2016
WO    WO-2018113911 A1 *    6/2018 ......... G06K 9/00355

OTHER PUBLICATIONS

International Search Report and Written Opinion dated Jul. 9, 2019 in connection with International Application No. PCT/EP2019/061710.

(Continued)

*Primary Examiner* — Luke D Ratcliffe

(57) ABSTRACT

The present disclosure pertains to a device which has a circuitry that obtains image data of a scene being representative of a time of flight measurement of light reflected from the scene, wherein the image data is based on a pattern of light being illuminated on the scene, wherein the pattern of light includes high intensity light areas and low intensity light areas; obtains, based on the image data, first image data being representative of the high intensity light areas; obtains, based on the image data, second image data being representative of the low intensity light areas; estimates direct component image data based on the first image data and the second image data; and generates a depth map of the scene based on the direct component image data and the second image data.

24 Claims, 7 Drawing Sheets

(51) Int. Cl.
G01S 17/894 (2020.01)
G06T 5/20 (2006.01)
G06T 7/521 (2017.01)

(56) References Cited

U.S. PATENT DOCUMENTS

| | | |
|---|---|---|
| 2015/0193938 A1 | 7/2015 | Freedman |
| 2015/0253429 A1* | 9/2015 | Dorrington ........... G01S 17/894 356/5.01 |
| 2016/0063715 A1 | 3/2016 | Wan |
| 2017/0123067 A1* | 5/2017 | Van Der Tempel .... G01S 17/89 |
| 2017/0316602 A1 | 11/2017 | Smirnov |
| 2018/0059225 A1 | 3/2018 | Zhu |

OTHER PUBLICATIONS

Falie et al., Distance Errors Correction for the Time of Flight (ToF) cameras. IEEE International Workshop on Imaging Systems and Techniques (IST). Sep. 10-12, 2008. 4 pages.

Falie et al., Further investigations on ToF cameras distance errors and their corrections. 4th European Conference on Circuits and Systems for Communications (ECCSC). Jul. 10, 2008. pp. 197-200.

PCT/EP2019/061710, Jul. 9, 2019, International Search Report and Written Opinion.

Shen et al., Depth map enhancement method based on joint bilateral filter. 2014 7th International Congress on Image and Signal Processing. Oct. 14, 2014:153-8.

* cited by examiner

IMAGING DEVICE AND METHOD

CROSS-REFERENCE TO RELATED APPLICATIONS

This application claims the benefit under 35 U.S.C. § 371 as a U.S. National Stage Entry of International Application No. PCT/EP2019/061710, filed in the European Patent Office as a Receiving Office on May 7, 2019, which claims priority to European Patent Application Number EP18171594.7, filed in the European Patent Office on May 9, 2018, each of which is hereby incorporated by reference in its entirety.

TECHNICAL FIELD

The present disclosure generally pertains to a device and a method in the field of image processing.

TECHNICAL BACKGROUND

Generally, a device such as a time of flight camera is known which has a light emitter and a detection source for illuminating a scene and detecting light reflected from the scene, respectively.

For example, a time of flight camera that has a ToF sensor is known that illuminates a scene and further generates a depth map of the scene.

Moreover, it is known that the light reflected from the scene includes the so-called multipath interference (MPI) which results in MPI-related errors and reduces the signal to noise ratio.

However, for example, the depth maps generated using such devices may typically have depth errors, low image resolution, or the like.

Although techniques exist for obtaining image data and generating depth maps, it is generally desirable to improve devices and methods for obtaining image data and generating depth maps of the scenes.

SUMMARY

According to a first aspect, the disclosure provides a device comprising circuitry configured to obtain image data of a scene being representative of a time of flight measurement of light reflected from the scene, wherein the image data is based on a pattern of light being illuminated on the scene, wherein the pattern of light includes high intensity light areas and low intensity light areas; obtain, based on the image data, first image data being representative of the high intensity light areas; obtain, based on the image data, second image data being representative of the low intensity light areas; estimate direct component image data based on the first image data and the second image data; and generate a depth map of the scene based on the direct component image data and the second image data.

According to a second aspect, the disclosure provides a method comprising obtaining image data of a scene being representative of a time of flight measurement of light reflected from the scene, wherein the image data is based on a pattern of light being illuminated on the scene, wherein the pattern of light includes high intensity light areas and low intensity light areas; obtaining, based on the image data, first image data being representative of the high intensity light areas; obtaining, based on the image data, second image data being representative of the low intensity light areas; estimating direct component image data based on the first image data and the second image data; and generating a depth map of the scene based on the direct component image data and the second image data.

Further aspects are set forth in the dependent claims, the drawings and the following description.

BRIEF DESCRIPTION OF THE DRAWINGS

Embodiments are explained by way of example with respect to the accompanying drawings, in which.

DETAILED DESCRIPTION OF EMBODIMENTS

Figure 2:
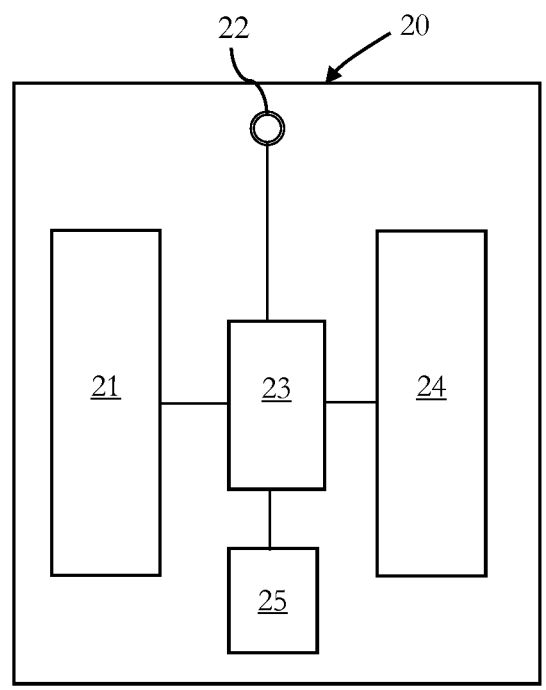
FIG. 2 schematically illustrates an embodiment of a device including a circuitry for obtaining image data and generating a depth map of a scene.

Before a detailed description of the embodiments under reference of FIG. 2 is given, general explanations are made.

As mentioned in the outset, generally it is known how to illuminate an object in a scene and estimate a distance between the object in the scene and, for example, a detector or a camera. For instance, time of flight (ToF) cameras are known that illuminate a scene with a modulated light, determine the time a direct light ray takes to travel back to the camera and measure a distance to the objects in the scene, or the like.

Moreover, in the existing devices such as a time of flight camera, in addition to the direct reflection of the illuminated light, the time of flight sensor may receive other reflections coming from various sources, e.g., the so-called multipath interference (MPI) which may result in MPI-related errors, inaccurate depth values, or the like.

Furthermore, for known devices it has been recognized that they are inaccurate for generating a depth map of a scene, which has, for example, corners, objects with similar concave surfaces, objects with large differences in reflectivity, or the like.

The MPI-related errors may arise and may further result in depth errors (e.g. inaccurate depth values) that occur when the time of flight cameras are imaging, for example, corners, similar concave surfaces, or the like. Such errors are known as external MPI and are related to, e.g., captured scene, shapes of the objects in the scene, ambient condition, etc., in some embodiments.

Moreover, there are also errors known as internal MPI, which are related to, for example, lens scattering in the time of flight cameras, and they occur when objects with big differences in reflectivity are close to each other, or the like.

Different types of MPI errors may be considered as one global component in some embodiments that adds up to the direct component (i.e. of the reflected light). The global component may be considered as error of measurements which may cause inaccurate depth values.

Furthermore, the light reflected from the scene may represent dots (i.e. spots) that are not separated from each other, but rather have a roll off which may provide, for example, dot skirts that overlap each other and/or dot skirts that may fall onto several pixels, or the like. Therefore, the detected dots on the pixels may not be separated from each other, etc.

Moreover, the incident angle of light reflected from the scene on the ToF sensor may result in detecting the global component and the direct component of the reflected light on a same pixel of the ToF sensor. Hence, the direct component and the global component of the reflected light may not be separated.

In addition, it may be required to increase the sensor resolution in some embodiments and the field of view of the cameras, in order to (partially) separate the global component and the direct component of the reflected light, increase numbers of the obtained dots (i.e. spots) on a sensor, increase the image resolution, etc.

Consequently, some embodiments pertain to a device including circuitry configured to obtain image data of a scene being representative of a time of flight measurement of light reflected from the scene, wherein the image data is based on a pattern of light being illuminated on the scene, wherein the pattern of light includes high intensity light areas and low intensity light areas; obtain, based on the image data, first image data being representative of the high intensity light areas; obtain, based on the image data, second image data being representative of the low intensity light areas; estimate direct component image data based on the first image data and the second image data; and generate a depth map of the scene based on the direct component image data and the second image data.

The device may be any type of electronic device. For example, the device may be or may include an image processing device that is configured to obtain image data, generate the depth map of the scene, or the like. Moreover, the device may include a processor and/or an image processing unit, hence, a program may be installed on its circuitry and/or its processor and/or its image processing unit and the image data may be obtained, converted, generated, processed, etc.

The device may be or may include an imaging system, a smartphone, a computer, a robot, a (piece of) detection equipment, or the like.

The device may further be configured to obtain image data of a scene being representative of a time of flight measurement of light reflected from the scene.

The image data may be generated, for example, by a time of flight (ToF) sensor of a ToF camera. Moreover, the device and/or its circuitry may include an interface that is configured to obtain the image data.

In some embodiments, the interface may be adapted to communicate with a mobile telecommunication system, e.g., LTE, GSM, or the like. Moreover, the interface may further be adapted to perform wireless communication with a wireless local area network, for example, to communicate over Bluetooth. Thereby, in some embodiments, the circuitry may establish a connection to the internet.

The time of flight sensor may be based on a direct time-of-flight imager, a continuous wave time of flight (CWTOF), an RF-modulated light source, a range gated imager sensor, etc., without limiting the present disclosure in that regard. The time-of-flight sensor may include a range imaging camera, as it is generally known, which may be based on charge-coupled device (CCD) technology, complementary metal oxide semiconductor (CMOS) technology, or the like. The time-of-flight sensor may include an array of pixels, wherein each pixel includes one or more light detection elements.

The image data may be or may include the quadrature components of the signal obtained from the ToF sensor.

In some embodiments, the quadrature components may be obtained as I (real part) and Q (imaginary part), e.g., based on the image data obtained from the ToF sensor, as it is generally known to the skilled person.

Moreover, the image data may be based on a pattern of light being illuminated on the scene, wherein the pattern of light includes high intensity light areas and low intensity light areas For example, the device may include an illumination unit and the illumination unit may further be configured to illuminate the pattern of light, etc.

The illumination unit may be based on a light emitting diode (LED), a laser light, an IR (infrared) projector, a high intensity discharge (HID), e.g. a xenon lamp, etc., without limiting the present disclosure in that regard.

The pattern of light may be illuminated by an illumination unit that may have at least one (or more) light emitting element (s), e.g., a laser element, a light emitting diode, or the like. Moreover, different light emitting elements may emit different light intensities, therefore, a pattern of light that has high intensity light areas and low intensity light areas may be illuminated. Furthermore, the pattern of light may be reflected back from objects within the scene and, for example, a lens collects the light reflected from the scene and forms an image of objects in the scene on the ToF sensor, or the like.

Moreover, the first image data may be obtained. The first image data may be representative of the high intensity light areas.

For instance, the device may obtain the image data that includes the I and Q values, e.g., corresponding to both of the high intensity light areas and the low intensity light areas, as discussed above. Furthermore, the first image data for the high intensity light areas may be obtained based on the image data, which may include the I and Q values corresponding to the high intensity light areas.

For example, a program running on the circuitry of the device may determine the positions of the areas being illuminated by the high intensity light and may further obtain the first image data corresponding to the high intensity light areas, as it is generally known to the skilled person in the field of image processing.

Moreover, the second image data may be obtained. The second image data may be representative of the low intensity light areas.

For example, the second image data for the low intensity light areas may be obtained based on the image data, which, may include the I and Q values corresponding to the low intensity light areas. A program running on the circuitry of the device may determine the positions of the areas being illuminated by the low intensity light and may further obtain the second image data corresponding to the low intensity light areas, or the like.

Moreover, the device may further estimate the direct component image data. For example, the device may obtain the first image data and the second image data. Furthermore, the device and/or its circuitry and/or a program running on the circuitry may subtract the second image data from the first image data and may estimate the direct component image data. The direct component image data may include the (subtracted) I and Q values corresponding to the direct component, or the like.

In some embodiments, the I and Q values (i.e. of the corresponding (first/second/direct component) image data) may be used and a phase value may be estimated for the corresponding (first/second/direct component) image data), for example, based on the following equation:

$$\text{phase} = \tan^{-1}\left(\frac{Q}{I}\right), \quad (1)$$

Moreover, depending on the distance of objects in the scene from the ToF sensor, a delay may be observed between the illuminated pattern of light and the reception of its reflection at the ToF sensor.

The delay time may be measured and may further be converted to a distance information, for example, based on the following equation:

$$d = (\text{phase} \times \text{range})/2\pi, \quad (2)$$

As discussed, in some embodiments, the phase may be estimated, the delayed time may be measured and the distance to the objects in the scene and/or depth information may be estimated. Moreover, a three-dimensional (3-D) image of the scene and/or the depth map of the scene may be generated. In some embodiments, the time of flight sensor may detect position information (e.g. distance) for every pixel, and may further perform a 3D time of flight measurement, estimate distance information, generate the depth map, or the like.

Moreover, the device generates the depth map of the scene. For example, a program running on the circuitry of the device may generate the depth map of the scene based on the direct component image data and the second image data.

For instance, the second image data and the direct component image data may be obtained. Moreover, the phase values for the second image data and the direct component image data may be estimated. Furthermore, the estimated phase values may be used and the depth map of the scene may be generated.

Figure 1:
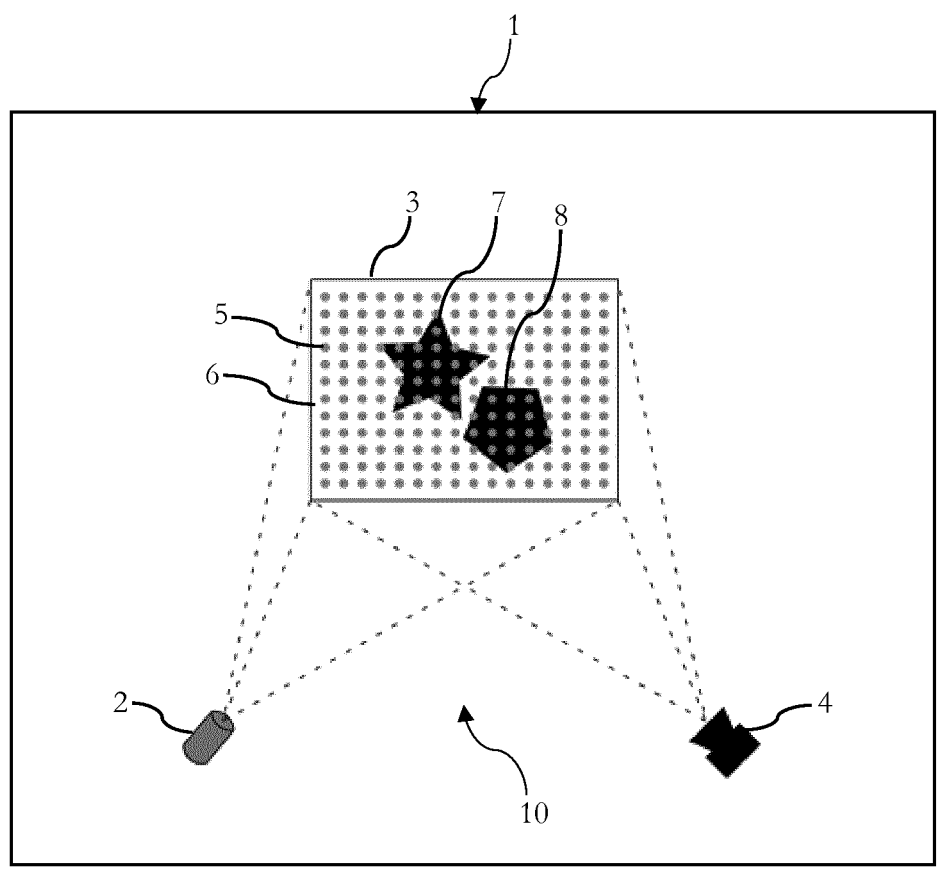
FIG. 1. schematically illustrates an embodiment of a system including the device, for illuminating a pattern of light including high intensity light areas and low intensity light areas.

FIG. 1 illustrates an embodiment of a system 1 including the device 10. The device 10 having a circuitry (not shown) including an illumination unit 2 which illuminates a pattern of light on the scene 3 and a part of the light reflected from the scene 3 is detected by a time of flight sensor 4. The pattern of light includes high intensity light areas 5 and low intensity light areas 6.

The scene 3 includes three-dimensional (3D) objects 7 and 8.

The high intensity light areas 5 are in a form of multiple dots patterns that impose a sparse sampling grid on the scene 3, for example, dots are centered at the coordinates lit up by each spot. In the following, the terms "high intensity light areas" and "dots areas" are used interchangeably.

The low intensity light areas 6 are, for example, (intermediary) areas and/or the valleys between dots that have a different light intensity from the dots, e.g., the pattern of light is designed to include the high intensity dots and some flooding light in the areas surrounding the dots.

In the following, the terms "low intensity light areas" and "valleys areas" are used interchangeably.

The image data including the I and Q values may be obtained based on a signal that is measured by the time of flight sensor 4 and may represent the time of flight measurement of light reflected from scene that is illuminated by the pattern of light having dots areas and valleys areas.

A signal that is measured by the time of flight sensor 4 in the low intensity light areas corresponding to valleys areas may be an estimate of the low intensity light (i.e. the flooded continuous light) and the global component of the reflected light and may further be used as, for example, a guide for interpolation, or the like.

As discussed, the first image data being representative of the high intensity light areas (i.e. the dots areas) may be obtained. For example, the first image data may include the quadrature component corresponding to the dots areas as $I_{dot}$ and $Q_{dot}$.

Moreover, the second image data being representative of the low intensity light areas (i.e. the valleys areas) may be obtained. For example, the second image data may include the quadrature component corresponding to the valleys areas as $I_{val}$ and $Q_{val}$.

Moreover, a measurement at dots areas may represent a high accuracy of depth value and may have a low image resolution, e.g., since there are few number of sampling points in the dots areas, etc. In addition, a measurement at valleys areas may represent a low accuracy of depth value and may have a high image resolution, e.g., since there are more number of sampling points in the valleys areas, etc.

In some embodiments, the generation of the depth map may include converting the image data to an intensity map.

For instance, the image data being representative of the time of flight measurements may be obtained. Furthermore, the quadrature components (I and Q) may be estimated, as discussed above.

Moreover, the circuitry, e.g., in some embodiments, a program running on the processor of the circuitry, may estimate the intensity, for example, based on the following equation:

$$\text{Intensity} = \sqrt{I^2 + Q^2}, \quad (3)$$

Hence, a value for the intensity may be estimated, which may be an indicator of amplitude of the signal obtained from the ToF sensor.

Furthermore, the circuitry may generate the intensity map, e.g., using the above estimated values for intensity.

In some embodiments, the generation of the depth map may include obtaining mask data based on the image data.

For example, the image data may be obtained. A program running on the circuitry and/or its processor may determine the quadrature components (I and Q values) using one of several smart modes, as it is known to the skilled person. Moreover, the intensity map may be used and the mask data may be obtained from the intensity map, or the like.

In some embodiments, the mask data may be or may include information of positions of the dots as $L_{dot}$ (i.e. the high intensity light areas) and information of positions of the valleys as $L_{val}$ (i.e. the low intensity light areas).

In some embodiments, obtaining mask data may include extracting a first mask representing positions corresponding to the high intensity light areas and extracting a second mask representing positions corresponding to the low intensity light areas.

Extracting of the first mask and the second mask may be based on several alternatives, without limiting the present disclosure to a specific extraction technique.

In some embodiments, extracting of the first mask may include applying a local-maxima filter on the intensity map.

For example, the image data may be obtained and may further be converted to the intensity map, as discussed above.

Moreover, the local-maxima filter may be applied on the intensity map with a kernel size related to the distance between dots areas, and the positions corresponding to the dots areas $L_{dot}$ (i.e. the high intensity light areas) may be obtained.

In some embodiments, extracting of the second mask includes applying a local-minima filter on the intensity map.

For example, the positions of the valleys areas $L_{val}$ may be obtained based on applying the local-minima filter on the intensity map with a kernel size related to the distance between dots and the size of the dots, or the like.

In some embodiments, the positions of the valleys areas may be determined based on, for example, selecting all the points in the image data after discarding the dots areas. Moreover, by using this technique, the number of determined points corresponding to valleys areas may be larger than when a local-minima filter is being applied.

Furthermore, as discussed, the valleys areas may correspond to, for example, non-accurate, corrupted depth values but having higher-resolution depth map. In addition, the dots areas may correspond to accurate depth values but having a lower-resolution.

In some embodiments, obtaining the first image data may include applying the first mask to the image data and obtaining the second image data may include applying the second mask to the image data.

As discussed above, the first mask may be obtained and it may correspond to the positions of the dots areas. Moreover, the first image data may be obtained, for example, the first image data may be the quadrature component of the dots areas as $I_{dot}$ and $Q_{dot}$.

The first image data and/or the quadrature component of the dots areas as $I_{dot}$ and $Q_{dot}$ may be obtained by applying the first mask to the image data (i.e. obtained from the time of flight sensor and including I and Q values). For example, the $I_{dot}$ and $Q_{dot}$ may correspond to the maximum values at the dots positions after running the local-maxima filter.

In some embodiments, the quadrature components corresponding to the dots areas ($I_{dot}$ and $Q_{dot}$) may be a weighted average value of a kernel centered at the position of the maximum values, and it may further depend, for example, on the resolution of the time of flight sensor, the dots areas, etc.

Moreover, the weights in the averaging kernel may be chosen to correct values that are far from the position of the maximum values or pixels having low signal to noise ratio, or the like.

In some embodiments, the quadrature components corresponding to the dots areas ($I_{dot}$ and $Q_{dot}$) may have a value after fitting a 2D Gaussian surface locally centered at the position of the maximum values around a kernel of size, and it may further depend, for example, on the resolution of the time of flight sensor, the dots areas, etc.

Moreover, the second image data may be obtained, for example, the second image data may be the quadrature component of the valleys areas as $I_{val}$ and $Q_{val}$.

The second image data and/or the quadrature component of the valleys areas as $I_{val}$ and $Q_{val}$ may be obtained by applying the second mask to the image data (i.e. obtained from the time of flight sensor and including I and Q values). For example, the $I_{val}$ and $Q_{val}$ may correspond to the minimum values after applying the local-minima filter on the intensity map with a kernel size related to the distance between dots and the size of the dots, and performing an interpolation.

As discussed above, the direct component image data may be obtained. For example, the direct component image data may be representative of the quadrature component of the direct component as $I_{direct}$ and $Q_{direct}$ and they may be obtained by subtracting the second image data from the first image data, as discussed above.

For example, the quadrature component of the direct component image data ($I_{direct}$ and $Q_{direct}$) may be obtained based on the following equations:

$$I_{direct} = I_{dot} - I_{val}, \quad (4)$$

$$Q_{direct} = Q_{dot} - Q_{val}, \quad (5)$$

In some embodiments, the direct component image data may be representative of a signal when the direct component of the light is separated from the global component of the light, without limiting the present disclosure to any specific embodiment. For example, a post processing may be performed and the direct and the global components of the light reflected from the scene may be separated, or the influence of the global component may be (partially) reduced, or the like.

In some embodiments, the generation of the depth map may include converting the direct component image data to a first depth map.

For example, the direct component image data may be obtained and it may include the corresponding quadrature component as $I_{direct}$ and $Q_{direct}$. Moreover, the phase values for the direct component image data (i.e. having $I_{direct}$ and $Q_{direct}$) may be estimated, e.g., using equation (1). Furthermore, the first depth map of the scene may be generated based on the estimated phase values. The first depth map of the scene may represent accurate points of the depth values, however, it may have a lower resolution.

Hence, the first depth map of the scene may be generated and it may have accurate depth values. In some embodiments, by subtracting the values corresponding to the valleys areas from the dots areas, and estimating the direct component image data, the influence of the global component of the light may be (partially) reduced on the generated first depth map.

In some embodiments, the generation of the depth map may include converting the second image data to a second depth map.

For example, the second image data may be obtained and it may include the quadrature component of the valleys areas as $I_{val}$ and $Q_{val}$, as discussed above. Moreover, the phase values for the second image data (i.e. having $I_{val}$ and $Q_{val}$) may be estimated, e.g., using equation (1). Furthermore, the second depth map of the scene may be generated based on the estimated phase values.

The second depth map of the scene may represent inaccurate depth values, however, it may have a higher resolution. For instance, the valleys areas representing a larger number of sampling points and therefore, the second depth map that is generated based on the second image data (i.e. valleys areas) may have a higher resolution than the first depth map.

In some embodiments, the depth values corresponding to the valleys areas may be inaccurate and/or corrupted depth values. Moreover, an interpolation may be performed and the depth values for the valleys areas may be recovered, persevered, etc.

In some embodiments, the generation of the depth map may include applying a joint bilateral filter representing two filter kernels including a distance kernel and a range kernel. One example of the distance kernel is a Gaussian kernel.

As discussed, the depth map of the scene may be generated based on the direct component image data and the second image data.

For example, the first map of the scene may be generated based on the direct component image data, and the second map of the scene may be generated based on the second image data. Furthermore, the joint bilateral filter may be applied.

For instance, the first depth map, the second depth map and the first mask may be used as an input to the join bilateral filter and the depth map of the scene may be generated as an output.

As discussed, the first depth map of the scene may represent accurate depth values, the second depth map may represent higher resolution, and the first mask may represent the position of the dots areas. Moreover, the joint bilateral filter may generate the depth map of the scene which may represent accurate depth values and may have a higher image resolution.

Hence, in some embodiments, the first depth map, the second depth map and the first mask may be, for example, interpolated and/or inpainted (e.g. by a smart inpainting algorithm such as the joint bilateral filter, or the like) and the depth map of the scene may be generated. Moreover, a (smart) combination of the first depth map and the second depth map may render the depth map of the scene, which may have an overall higher resolution and accurate depth values for both of the dots areas and the valleys areas.

The smart inpainting algorithm may be based on several techniques, depending on, for example, complexity of (first/second/direct component) image data, data-efficiency, etc., without limiting the present disclosure to a specific technique.

For instance, in some embodiments, the inpainting algorithm may be based on the joint bilateral filter, a total variation regularization technique, a deep neural network, etc., without limiting the present disclosure to a specific inpainting algorithm.

In some embodiments, the joint bilateral filter may serve as a smoothing/inpainting technique. For example, the joint bilateral filter may use at least two filter kernels including one filter for smoothing (e.g., a distance kernel such as Gaussian kernel) and one filter for edge preserving (e. g., the range kernel).

As discussed, the second depth map may include high resolution information which may be used to, for example, adapt the edge preserving range kernel of the joint bilateral filter. Therefore, in some embodiments, the smart inpainting algorithm may be performed, and the depth map of the scene may be generated. Moreover, the edges in the depth map may be preserved by using the range filter from the valleys areas, or the like.

In some embodiments, the generation of the depth map may be based on the total variation regularization technique.

For example, the dots areas may be interpolated by solving a total variation (TV)-regularized inverse problem, for generating an image (e.g. the depth map of the scene) characterized by having sharp edges.

The total variation regularization may obtain as input the quadrature component corresponding to the dots areas and the valleys areas, and may further jointly solve an inverse problem which may obtain a high-resolution direct component. The high resolution direct component may represent the corrected depth values without the global components of the reflected light. For example, the high resolution direct component may be obtained at higher-order of generalizing TV image priors in the solution of the inpainting problem. Moreover, such priors may not be data-driven and may be a representative of the depth map of the scene.

In some embodiments, the generation of the depth map may be based on the deep neural network, wherein the deep neural network generates the depth map based on at least one of the image data, the intensity map, the first image data, the second image data, the direct component image data, the first mask, and the second mask.

For example, the first image data (i.e. dots areas), the second image data (i.e. valleys areas), the intensity map, the first mask and the second mask may be fed into the deep neural network. The deep neural network may use a convolutional architecture and may be trained for regression, i.e., to perform jointly direct component and global component separation and an inpainting by using models and priors learned from a dataset.

Moreover, the deep neural network may output a high-resolution direct component image data. The deep neural network may be a data-driven approach, and it may leverage a dataset of depth maps tailored specifically for an application of interest (e.g., indoor/outdoor scenes).

In some embodiments, the circuitry may further include an illumination unit configured to illuminate the pattern of light on the scene.

In some embodiments, the circuitry may further include a time of flight sensor configured to obtain the image data.

Hence, in some embodiments, a direct measurement of the depth map may be provided, the depth values for the low intensity light areas may be estimated (e.g., the interpolation filter and/or the inpainting algorithm may be applied), and the resolution of the depth map after illuminating the pattern of light may be increased.

In some embodiments, it may be assumed that a signal measured by the ToF sensor corresponding to the valleys areas are caused by the MPI (i.e., external MPI, internal MPI and/or the global component), and it may further be used as an estimate of the said interference on the dots areas. Moreover, this estimation may further be used to correct the depth map of the scene, or the like.

In some embodiments, the dots areas and the valleys areas may not be uniformly distributed over the scene. Moreover, some interpolation (or inpainting) of the valleys areas may be performed. For example, the MPI contribution at the dots areas may be estimated, e.g., based on the information of the valleys areas. Moreover, the low resolution areas in the depth map may be super-resolved by performing some corrections, as discussed above.

In some embodiments, it may be possible to determine and eliminate the influence of the MPI-related errors with minimal impact on the resolution of the generated depth map of the scene.

In some embodiments, it may be possible to calibrate the depth map measurements, for example, the pattern of light may be illuminated by having some flooding light in the valleys areas. The signal measured at the valleys areas may be estimated and may further be considered as the global component of the light reflected from the scene. Moreover, the flooded continuous light in the valleys areas may be used as a guide for interpolation and/or inpainting and/or calibration, or the like.

As discussed, on one hand, the dots areas may be accurate but have low resolution. On the other hand, the valleys areas may be inaccurate but have a higher resolution (i.e. since there are larger number of sampling points in the valleys areas compared to those of the dots areas). Moreover, in some embodiments, the first depth map and the second depth map may be obtained, and the depth map of the scene may be generated, which may have accurate depth values and a high resolution.

In some embodiments, the circuitry may be included in an electronic device, for example, a smartphone. Moreover, the MPI-related errors on the electronic device (i.e. the smartphone) may be determined. For example, the pattern of the light featuring dots areas and valleys areas may be illuminated on a scene. Moreover, for example, the direct component image data may be obtained, the global component may be separated, the depth errors on the dots areas may be corrected, etc., as discussed above. Moreover, the valleys areas may be interpolated and/or inpainted, the depth map of the scene may be generated which may have a high-resolution.

Some embodiments pertain to a method including obtaining image data of a scene being representative of a time of flight measurement of light reflected from the scene, wherein the image data is based on a pattern of light being illuminated on the scene, wherein the pattern of light includes high intensity light areas and low intensity light areas; obtaining, based on the image data, first image data being representative of the high intensity light areas; obtaining, based on the image data, second image data being representative of the low intensity light areas; estimating direct component image data based on the first image data and the second image data; and generating a depth map of the scene based on the direct component image data and the second image data. The method may be performed by the circuitry and/or its processing unit and/or a program running on the circuitry as discussed herein, and/or a processor, a computer, a tablet pc, etc.

As discussed, the method may further include converting the direct component image data to a first depth map. As discussed, the depth map of the scene may be generated, moreover, generating of the depth map may include converting the second image data to a second depth map. The method may further include converting the image data to an intensity map. Moreover, the method may further include obtaining mask data based on the image data. As discussed, the mask data may be obtained, the method may further include extracting a first mask representing positions corresponding to the high intensity light areas and extracting a second mask representing positions corresponding to the low intensity light areas. The method may further include applying a local-maxima filter on the intensity map. Moreover, the method may further include applying a local-minima filter on the intensity map. As discussed, the first image data and the second image data may be obtained, moreover, the method may further include applying the first mask to the image data and applying the second mask to the image data. Moreover, the method may further include applying a joint bilateral filter representing two filter kernels including a Gaussian kernel and a range kernel. As discussed, the pattern of light may be illuminated, moreover, the method may further include illuminating the pattern of light on the scene. Moreover, the method may further include obtaining the image data.

The methods as described herein are also implemented in some embodiments as a computer program causing a computer and/or a processor to perform the method, when being carried out on the computer and/or processor. In some embodiments, also a non-transitory computer-readable recording medium is provided that stores therein a computer program product, which, when executed by a processor, such as the processor described above, causes the methods described herein to be performed.

Returning to FIG. 2, an embodiment of a device 20 including the circuitry (not shown) is described. The device 20 may be the same or similar to device 10, as discussed above, and has a similar function.

The device 20 includes the circuitry having an interface 21, an illumination unit 22, a processor (CPU) 23 (including one or more processor), a time of flight sensor 24, and a storage 25 which is based on a flash memory.

The interface 21 is adapted to communicate with a mobile telecommunication system, e.g., LTE, GSM, or the like. It is also adapted to perform wireless communication with a wireless local area network ad, for example, to communicate over Bluetooth. Thereby, the device 20 can establish a connection to the internet.

The circuitry is able to obtain image data by its interface 21.

The illumination unit 22 is based on an IR projector and illuminates a pattern of light on a scene. The pattern of light includes high intensity light areas (dots areas) and low intensity light areas (valleys areas), as discussed above.

The device 20, including circuitry, further has a processor (CPU) 23, the processor 23 of the circuitry is able to run a computer program, for example, a computer program may run on the processor 23 of the circuitry which can control, for example, illuminating a scene with the pattern of light, illuminating high intensity areas, illuminating low intensity areas, or the like.

Moreover, several computer programs may run on the processor 23 of the circuitry which can obtain the image data, obtain first image data, obtain second image data, obtain direct component image data, generate a first depth map, generate a second depth map and generate a depth map of the scene, or the like.

Figure 3:
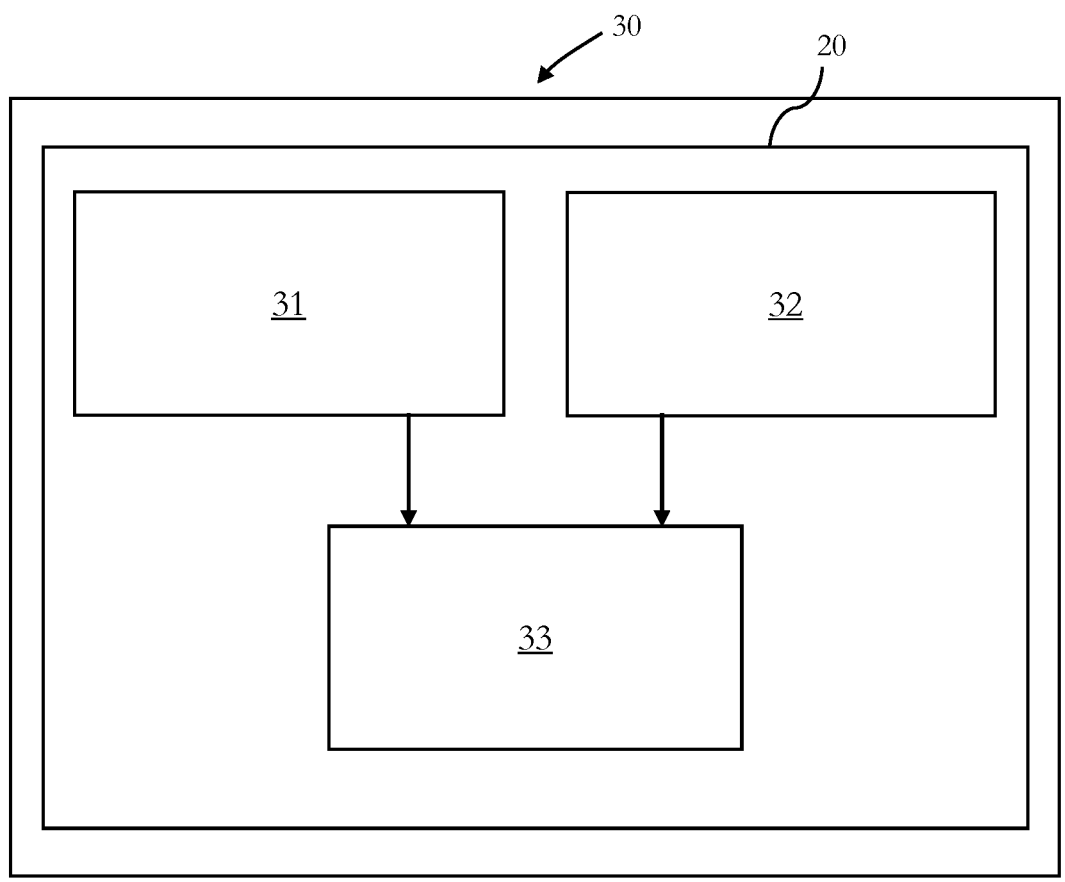
FIG. 3 schematically illustrates an embodiment of a system for obtaining image data and estimating direct component image data.

Hence, the device 20, including the circuitry, is able to, for example, obtain image data, obtain first image data, obtain second image data, estimate direct component image data and generate the depth map of the scene FIG. 3 illustrates an embodiment of a system 30 including the device 20 having the circuitry (as discussed above under FIG. 2) for obtaining image data, obtaining first image data, obtaining second image data and estimating direct component image data. The system 30 may be or may include the device 10 and/or the device 20. In the following, the system 30 is illustrated based on the device 20 without limiting the present disclosure to this specific structure.

The circuitry of the device 20 obtains image data of a scene by its interface 21.

A program running on the processor 23 of the circuitry of the device 20 obtains a first image data 31 and a second image data 32, as discussed above.

The first image data 31 is representative of the positions corresponding to the dots areas ($L_{dot}$) and includes the corresponding quadrature component of the dots areas as $I_{dot}$ and $Q_{dot}$. The first image data 31 is representative of the direct and global component of the light reflected from the scene.

The second image data 32 is representative of the positions of the valleys areas (I) and includes the corresponding quadrature component of the valleys areas as $I_{val}$ and $Q_{val}$. The second image data is representative of the global component of the light reflected from the scene.

The circuitry of the device 20 interpolates the first image data 31 and the second image data 32, a program running on the processor 23 of the circuitry performs the interpolation of the first image data 31 and the second image data 32.

The circuitry further estimates a direct component image data. The direct component image data is estimated based on subtracting the second image data from the first image data.

The direct component image data includes the corresponding quadrature components as $I_{direct}$ and $Q_{direct}$ being representative of the direct component of light reflected from the scene.

A program running on the circuitry performs the subtraction of the (interpolated) second image data 32 from the (interpolated) first image data 31 and estimates the direct component image data 33.

Figure 4:
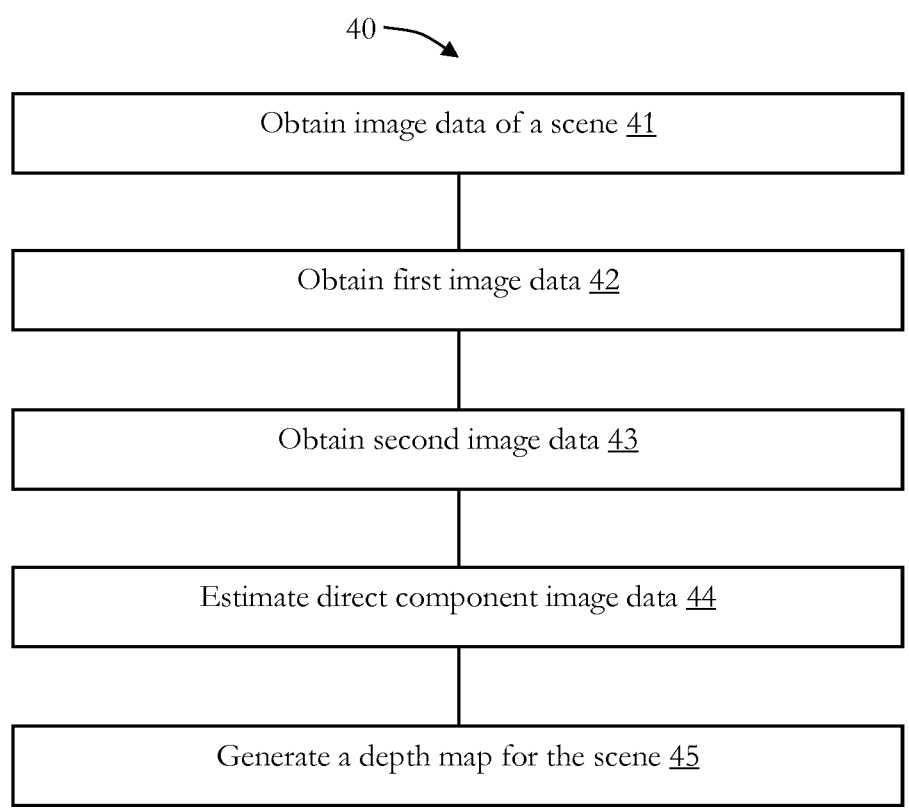
FIG. 4 illustrates a method for generating a depth map of a scene.

In the following, a method 40 for generating a depth map of a scene is explained under the reference of FIG. 4. The method may be performed by and with any of the devices described herein, such as the device 10 of FIG. 1 and the device 20 of FIGS. 2 to 3. Without limiting the disclosure, in the following, the method 40 is discussed exemplary based on the device 20, which is similar to the device 10.

At 41, the circuitry of the device 20 obtains image data of a scene. The image data include the quadrature component as I and Q, as discussed above.

The image data are generated based on illuminating the scene with a pattern of light. The pattern of light includes high intensity light areas and low intensity light areas. The pattern of light is a specially designed pattern that includes dots areas and valleys areas (e.g. having flooded light at a much lower intensity than the spots but enough to guide an edge preserving inpainting algorithm), as discussed above.

The scene reflects light (i.e. parts of the illuminated pattern of light), as discussed above.

The circuitry of the device 20 obtains image data by controlling the ToF sensor 24 to detect the reflected light from the scene. The ToF sensor 24 detects parts of the reflected light that are in its field of view.

Moreover, the circuitry obtains the image data with its interface 21, as discussed above.

At 42, the circuitry obtains first image data. The first image data are obtained based on the image data and are representative of the high intensity light areas, as discussed above.

A program running on the processor 23 of the circuitry of the device 20 obtains the first image data, as discussed above. The first image data include the corresponding quadrature component of the dots areas as $I_{dot}$ and $Q_{dot}$. The first image data are representative of the direct and global component of the light reflected from the scene.

At 43, the circuitry of the device 20 obtains second image data. The second image data are obtained based on the image data and are representative of the low intensity light areas, as discussed above.

A program running on the processor 23 of the circuitry of the device 20 obtains the second image data, as discussed above. The second image data includes the corresponding quadrature component of the valleys areas as $I_{val}$ and $Q_{val}$. The second image data may be representative of the global component of the light reflected from the scene.

At 44, the circuitry of the device 20 estimates direct component image data. The direct component image data are estimated based on the obtained first image data and the obtained second image data.

A program running on the processor 23 of the circuitry of the device 20 subtracts the second image data from the first image data and estimates the direct component image data, as discussed above.

At 45, the circuitry of the device 20 generates a depth map of the scene. The depth map of the scene is generated based on the direct component image data and the second image data.

For example, a program running on the circuitry converts the image data to an intensity map, as discussed above.

Moreover, a program running on the circuitry obtains mask data, extracts a first mask, and extracts a second mask, as discussed above.

Furthermore, a program running on the circuitry generates a first depth map and a second depth map, as discussed above.

The circuitry generates the depth map of the scene based on a joint bilateral filter, by using the first depth map, the second depth map and the first mask, as discussed above.

Figure 5:
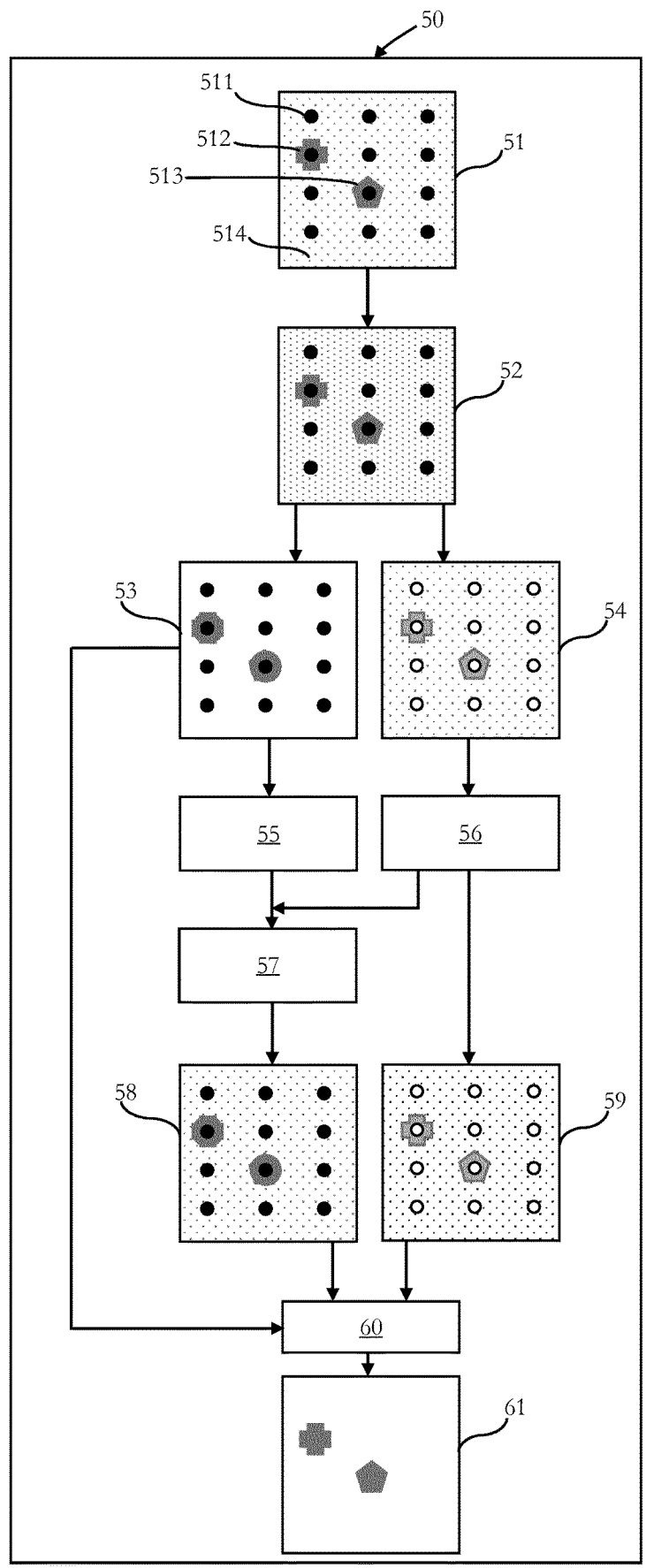
FIG. 5 schematically illustrates an embodiment of a system for obtaining image data, obtaining first image data, obtaining second image data, estimating direct component image data and generating a depth map of a scene.

FIG. 5 illustrates a system 50 for obtaining image data, obtaining mask data, obtaining first image data, obtaining second image data, estimating direct component image data and generating a depth map of a scene.

The system 50 may be the device including the circuitry, or the device including the circuitry may be incorporated in the system 50, without limiting the present disclosure to this specific structure. For example, the system 50 may be a computer, a remote server, or the like.

Without limiting the disclosure, in the following, the system 50 is discussed exemplary based on the device 20, which is similar to device 10.

The circuitry of device 20 obtains image data 51 of the scene including 3D objects 512 and 513 having sharp edges. The image data includes high intensity light areas 511 (dots areas) and low intensity light areas 514 (valleys areas), as discussed above.

Moreover, the image data 51 include the quadrature component (I and Q), as discussed above.

The high intensity light areas 511 are representative of low resolution but accurate depth values. The low intensity light areas 514 are representative of high resolution but inaccurate depth values.

A program running on the circuitry converts the obtained image data 51 to an intensity map 52, as discussed above.

The circuitry of the device 20 further obtains mask data and extracts a first mask 53 and a second mask 54, as discussed above.

A program running on the circuitry of the device 20 applies a local-maxima filter on the intensity map 52 and obtains the first mask 53, as discussed above.

The first mask 53 is representative of the position of the dots areas, as discussed above.

Moreover, the program further applies a local-minima filter on the intensity map 52 and obtains the second mask 54, as discussed above.

The second mask 54 is representative of the position of the valleys areas, as discussed above.

Moreover, the circuitry of the device 20 obtains the first image data 55.

A program running on the circuitry of the device 20 applied the first mask 53 to the image data 51 and obtains the first image data 55, as discussed above.

The first image data 55 are representative of the high intensity light areas (i.e. dots areas) and include the corresponding quadrature component of the dots areas as $I_{dot}$ and $Q_{dot}$. In addition, the first image data 55 may be representative of the direct and global component of the light reflected from the scene.

As discussed, the first image data 55 are representative of accurate depth values but having lower resolution. Moreover, the images of the objects in the scene have also accurate depth values and a lower resolution, as discussed above. In addition, an interpolation and/or inpainting may be performed and information related to the edges of the objects may be recovered, preserved, as discussed above.

Moreover, the circuitry of the device 20 obtains the second image data 56.

A program running on the circuitry of the device 20 applied the second mask 54 to the image data 51 and obtains the second image data 56, as discussed above.

The second image data 56 are representative of the low intensity light areas (i.e. valleys areas) and include the corresponding quadrature component of the valleys areas as $I_{val}$ and $Q_{val}$. The second image data 56 may be representative of the global component of the light reflected from the scene.

Moreover, a program running on the circuitry of the device 20 subtracts the second image data 56 from the first image data 55 and obtains the direct component image data 57, as discussed above.

The circuitry of the device 20 further generates a first depth map of the scene 58. A program running on the circuitry of the device 20 estimates phase values for the direct component image data 57 and generates the first depth map of the scene 58, as discussed above.

The first depth map of the scene 58 has accurate depth values, but lower resolution.

The circuitry of the device 20 further generates the second depth map of the scene 59.

A program running on the circuitry of the device 20 estimates phase values for the second image data 56 and generates the second depth map of the scene 59, as discussed above.

The second depth map of the scene 59 has inaccurate depth values, but higher resolution than the first depth map of the scene 58.

As discussed, the first depth map of the scene 58 is generated based on the direct component image data 57, which includes the information of dots areas, too. Moreover, since, the dots areas are representing accurate depth values, therefore, the first depth map also has accurate depth values, as discussed above.

Moreover, the second depth map of the scene 59 is generated based on the second image data 56, which includes the information of the valleys areas representing a higher resolution.

Hence, the first depth map of the scene 58, which has accurate depth values, and the second depth map of the scene 59, which has a higher image resolution, is generated.

Furthermore, the circuitry of the device 20 generates a depth map of the scene 61 based on an inpainting algorithm 60.

A program running on the circuitry of the device 20 applies a joint bilateral filter in which the first depth map 58, the second depth map 59 and the first mask 53 have been input to the inpainting algorithm 60, as discussed above.

Moreover, the generated depth map of the scene 61 has accurate depth values and a higher image resolution. In addition, the information related to the edges of the objects in the scene are recovered, and the depth values corresponding to the valleys areas are corrected.

Figure 6:
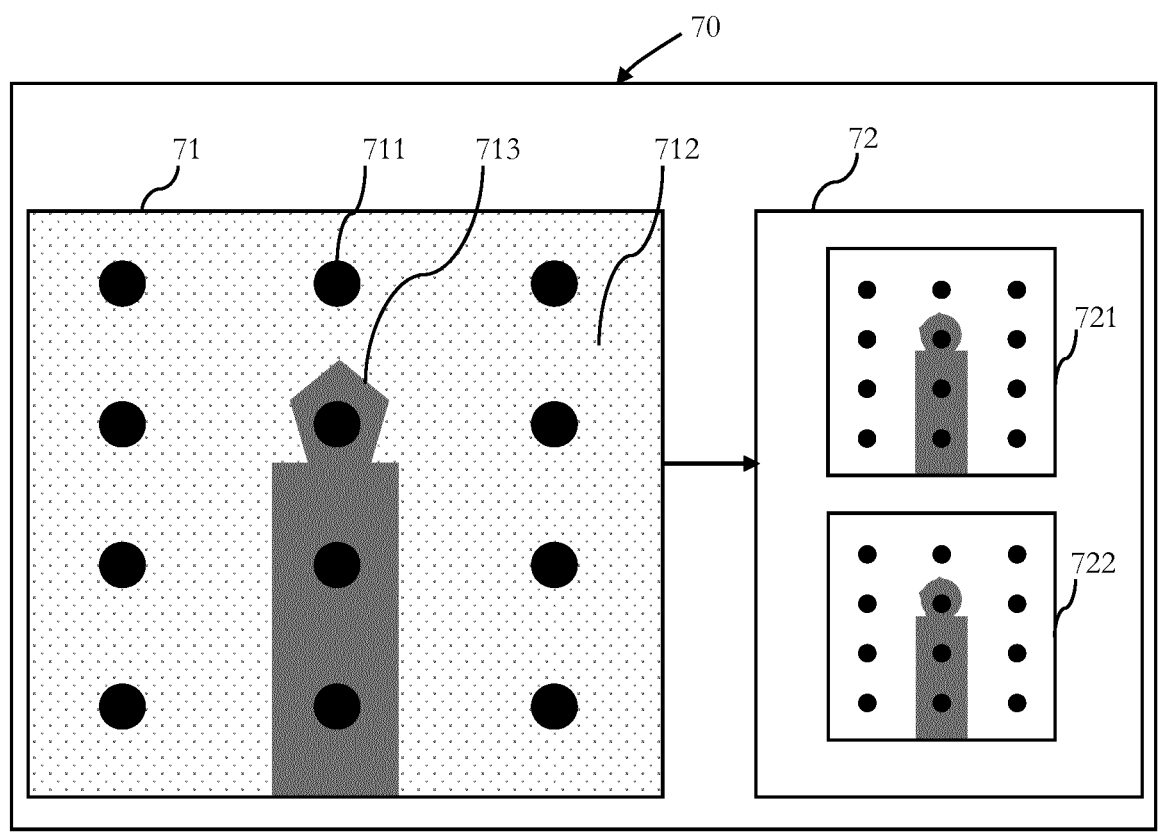
FIG. 6 schematically illustrates an embodiment of a system for obtaining first image data.

FIG. 6 illustrates an embodiment of a system 70 for obtaining image data and first image data.

The system 70 may be the device, or the device may be incorporated in the system 70, without limiting the present disclosure to this specific structure. In the following, the system 70 is discussed exemplary based on the device 20, which is similar to device 10.

The circuitry of the device 20 obtains image data 71 of the scene. The image data 71 includes high intensity light areas 711 (dots areas) and low intensity light areas 712 (valleys areas), as discussed above. Moreover, an image of an object 713 (i.e. a 3D object in the scene) is present in the image data 71.

The image data 71 are measured by using a time of flight camera, as discussed above.

The high intensity light areas 711 have a low resolution but accurate depth values. The low intensity light areas 712 have a high resolution but inaccurate depth values. The object in the scene and consequently the image of the object 713 has sharp edges.

A program running on the circuitry of the device 20 determines the dots areas and the valleys areas, as discussed above.

Moreover, the circuitry of the device 20 obtains the first image data 72.

A program running on the circuitry of the device 20 applied a first mask (not shown) to the image data 71 and obtains the first image data 72, as discussed above.

The first image data 72 are representative of the high intensity light areas (i.e. dots areas) and include the corresponding quadrature component of the dots areas including the real parts with marked dots (maxima) $I_{dot}$ 721 and the imaginary parts with marked dots (maxima) $Q_{dot}$ 722. In addition, the first image data 72 are representative of the direct and global component of the light reflected from the scene.

As discussed, the first image data 72 are representative of accurate depth values but having lower resolution. Moreover, the image of the object in the scene has also accurate depth values and a lower resolution.

In addition, an interpolation and/or inpainting may be performed and information related to the edges of the object may be preserved, as discussed above.

Figure 7:
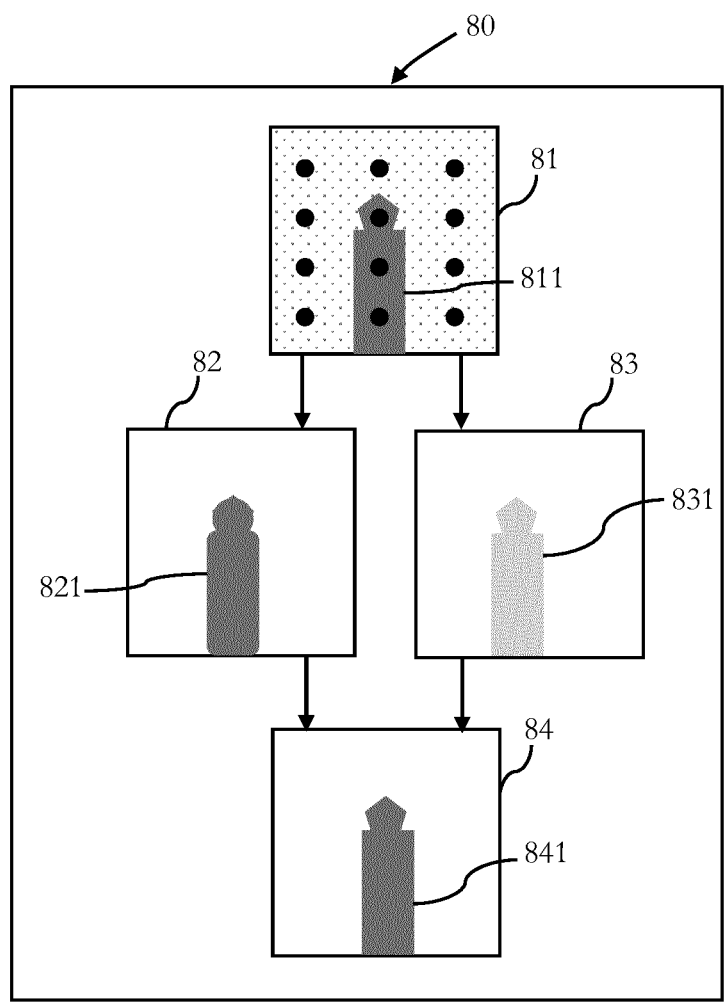
FIG. 7 schematically illustrates an embodiment of a system for generating a first depth map, generating a second depth map and generating a depth map of a scene.

FIG. 7 illustrates a system 80 for obtaining image data, generating a first depth map, generating a second depth map and generating a depth map of a scene.

The system 80 may be the device, or the device may be incorporated in the system 80, without limiting the present disclosure to this specific structure. In the following, the system 80 is discussed exemplary based on the device 20, which is similar to device 10.

The circuitry of the device 20 obtains image data 81 of the scene. The image data 81 includes high intensity light areas (dots areas) and low intensity light areas (valleys areas). Moreover, an image of an object 811 (i.e. a 3D object in the scene) is present in the image data 81.

The image data 81 are measured by using a time of flight camera, as discussed above.

The circuitry of the device 20 further generates a first depth map of the scene 82. A program running on the circuitry of the device 20 estimates direct component image data, as discussed above, and generates the first depth map of the scene 82.

The first depth map of the scene 82 has accurate depth values, but lower resolution. Consequently, the image of the object 821 has accurate depth values but low image resolution and the information about the edges of the object needs to be recovered.

The circuitry of the device 20 further generates the second depth map of the scene 83.

A program running on the circuitry of the device 20 obtains second image data, as discussed above, estimates phase values for the second image data, and generates the second depth map of the scene 83, as discussed above.

The second depth map of the scene 83 has inaccurate depth values, but higher resolution than the first depth map of the scene 82. Consequently, the image of the object 831 has inaccurate depth values at regions corresponding to the valleys areas, but higher image resolution. The depth values for the valleys areas are inaccurate and may be corrected.

Hence, the first depth map of the scene 82, which has accurate depth values, and the second depth map of the scene 83, which has a higher image resolution, is generated.

Furthermore, the circuitry of the device 20 generates the depth map of the scene 84 based on an inpainting algorithm, which is a joint bilateral filter.

A program running on the circuitry of the device 20 applies the joint bilateral filter in which the first depth map 82, the second depth map 83, and the first mask (not shown) have been input to the inpainting algorithm, as discussed above.

Moreover, the generated depth map of the scene 84 and consequently the image of the object in the scene 841 has accurate depth values and a higher image resolution. In addition, the information related to the edges of the objects in the scene are recovered and the depth values for the valleys areas are corrected.

It should be recognized that the embodiments describe methods with an exemplary ordering of method steps. The specific ordering of method steps is however given for illustrative purposes only and should not be construed as binding. For example, the ordering of 24 and 25 in the embodiment of FIG. 2 may be exchanged. Also, the ordering of 42 and 43 in the embodiment of FIG. 4 may be exchanged. Further, also the ordering of 53 and 54 in the embodiment of FIG. 5 may be exchanged. Other changes of the ordering of method steps may be apparent to the skilled person.

Please note that the division of the circuitry of the device 20 into units 21 to 25 is only made for illustration purposes and that the present disclosure is not limited to any specific division of functions in specific units. For instance, the circuitry of the device 20 could be implemented by a respective programmed processor, field programmable gate array (FPGA) and the like.

A method for controlling an electronic device such as the device 20 as discussed above, is described in the following and under reference of FIG. 4. The method can also be implemented as a computer program causing a computer and/or a processor, such as processor 23 discussed above, to perform the method, when being carried out on the computer and/or processor. In some embodiments, also a non-transitory computer-readable recording medium is provided that stores therein a computer program product, which, when executed by a processor, such as the processor described above, causes the method described to be performed.

All units and entities described in this specification and claimed in the appended claims can, if not stated otherwise, be implemented as integrated circuit logic, for example on a chip, and functionality provided by such units and entities can, if not stated otherwise, be implemented by software.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below.

(1) A device comprising circuitry configured to:
obtain image data of a scene being representative of a time of flight measurement of light reflected from the scene, wherein the image data is based on a pattern of light being illuminated on the scene, wherein the pattern of light includes high intensity light areas and low intensity light areas;
obtain, based on the image data, first image data being representative of the high intensity light areas;
obtain, based on the image data, second image data being representative of the low intensity light areas;
estimate direct component image data based on the first image data and the second image data; and
generate a depth map of the scene based on the direct component image data and the second image data.

(2) The device of (1), wherein the generation of the depth map includes converting the direct component image data to a first depth map.

(3) The device of (1) or (2), wherein the generation of the depth map includes converting the second image data to a second depth map.

(4) The device of anyone of (1) to (3), wherein the generation of the depth map includes converting the image data to an intensity map.

(5) The device of anyone of (1) to (4), wherein the generation of the depth map includes obtaining mask data based on the image data.

(6) The device of anyone of (1) to (5), wherein obtaining mask data includes extracting a first mask representing positions corresponding to the high intensity light areas and extracting a second mask representing positions corresponding to the low intensity light areas.

(7) The device of anyone of (1) to (6), wherein extracting of the first mask includes applying a local-maxima filter on the intensity map.

(8) The device of anyone of (1) to (7), wherein extracting of the second mask includes applying a local-minima filter on the intensity map.

(9) The device of anyone of (1) to (8), wherein obtaining the first image data includes applying the first mask to the image data and obtaining the second image data includes applying the second mask to the image data.

(10) The device of anyone of (1) to (9), wherein generating of the depth map includes applying a joint bilateral filter representing two filter kernels including a Gaussian kernel and a range kernel.

(11) The device of anyone of (1) to (10), wherein the circuitry further comprises an illumination unit configured to illuminate the pattern of light on the scene.

(12) The device of anyone of (1) to (11), wherein the circuitry further comprises a time of flight sensor configured to obtain the image data.

(13) A method comprising:
obtaining image data of a scene being representative of a time of flight measurement of light reflected from the scene, wherein the image data is based on a pattern of light being illuminated on the scene, wherein the pattern of light includes high intensity light areas and low intensity light areas;
obtaining, based on the image data, first image data being representative of the high intensity light areas;
obtaining, based on the image data, second image data being representative of the low intensity light areas;
estimating direct component image data based on the first image data and the second image data; and generating a depth map of the scene based on the direct component image data and the second image data.
(14) The method of (13), wherein generating of the depth map includes converting the direct component image data to a first depth map.
(15) The method of (13) or (14), wherein generating of the depth map includes converting the second image data to a second depth map.
(16) The method of anyone of (13) to (15), wherein generating of the depth map includes converting the image data to an intensity map.
(17) The method of anyone of (13) to (16), wherein generating of the depth map includes obtaining mask data based on the image data.
(18) The method of anyone of (13) to (17), wherein obtaining mask data includes extracting a first mask representing positions corresponding to the high intensity light areas and extracting a second mask representing positions corresponding to the low intensity light areas.
(19) The method of anyone of (13) to (18), wherein extracting of the first mask includes applying a local-maxima filter on the intensity map.
(20) The method of anyone of (13) to (19), wherein extracting of the second mask includes applying a local-minima filter on the intensity map.
(21) The method of anyone of (13) to (20), wherein obtaining the first image data includes applying the first mask to the image data and obtaining the second image data includes applying the second mask to the image data.
(22) The method of anyone of (13) to (21), wherein generating of the depth map includes applying a joint bilateral filter representing two filter kernels including a Gaussian kernel and a range kernel.
(23) The method of anyone of (13) to (22), further comprising illuminating the pattern of light on the scene.
(24) The method of anyone of (13) to (23), further comprising obtaining the image data.
(25) A computer program comprising program code causing a computer to perform the method according to anyone of (13) to (24), when being carried out on a computer.
(26) A non-transitory computer-readable recording medium that stores therein a computer program product, which, when executed by a processor, causes the method according to anyone of (13) to (24) to be performed.

The invention claimed is:
1. A device comprising circuitry configured to:
obtain image data of a scene being representative of a time of flight measurement of light reflected from the scene, wherein the image data is based on a pattern of light being illuminated on the scene, wherein the pattern of light includes high intensity light areas and low intensity light areas;
obtain, based on the image data, first image data being representative of the high intensity light areas;
obtain, based on the image data, second image data being representative of the low intensity light areas;
estimate direct component image data based on the first image data and the second image data; and
generate an output depth map of the scene based on the direct component image data and the second image data, comprising:
converting the direct component image data to a first depth map;
converting the second image data to a second depth map, the second depth map having a higher resolution than the first depth map; and
using the first depth map and the second depth map to generate the output depth map.

2. The device of claim 1, wherein the generation of the output depth map includes converting the image data to an intensity map.

3. The device of claim 1, wherein the generation of the output depth map includes obtaining mask data based on the image data.

4. The device of claim 3, wherein obtaining mask data includes extracting a first mask representing positions corresponding to the high intensity light areas and extracting a second mask representing positions corresponding to the low intensity light areas.

5. The device of claim 4, wherein extracting of the first mask includes applying a local-maxima filter on the intensity map.

6. The device of claim 4, wherein extracting of the second mask includes applying a local-minima filter on the intensity map.

7. The device of claim 4, wherein obtaining the first image data includes applying the first mask to the image data and obtaining the second image data includes applying the second mask to the image data.

8. The device of claim 1, wherein generating of the output depth map includes applying a joint bilateral filter representing two filter kernels including a Gaussian kernel and a range kernel.

9. The device of claim 1, wherein the circuitry further comprises an illumination unit configured to illuminate the pattern of light on the scene.

10. The device of claim 1, wherein the circuitry further comprises a time of flight sensor configured to obtain the image data.

11. The device of claim 1, wherein converting the second image data to a second depth map comprises:
estimating the second depth map using an unseparated global component of reflected light for the low intensity light areas.

12. A method comprising:
obtaining image data of a scene being representative of a time of flight measurement of light reflected from the scene, wherein the image data is based on a pattern of light being illuminated on the scene, wherein the pattern of light includes high intensity light areas and low intensity light areas;
obtaining, based on the image data, first image data being representative of the high intensity light areas;
obtaining, based on the image data, second image data being representative of the low intensity light areas;
estimating direct component image data based on the first image data and the second image data; and
generating an output depth map of the scene based on the direct component image data and the second image data, comprising:
converting the direct component image data to a first depth map;
converting the second image data to a second depth map, the second depth map having a higher resolution than the first depth map; and
using the first depth map and the second depth map to generate the output depth map.

13. The method of claim 12, wherein generating of the output depth map includes converting the image data to an intensity map.

14. The method of claim 12, wherein generating of the output depth map includes obtaining mask data based on the image data.

15. The method of claim 14, wherein obtaining mask data includes extracting a first mask representing positions corresponding to the high intensity light areas and extracting a second mask representing positions corresponding to the low intensity light areas.

16. The method of claim 15, wherein extracting of the first mask includes applying a local-maxima filter on the intensity map.

17. The method of claim 15, wherein extracting of the second mask includes applying a local-minima filter on the intensity map.

18. The method of claim 15, wherein obtaining the first image data includes applying the first mask to the image data and obtaining the second image data includes applying the second mask to the image data.

19. The method of claim 12, wherein generating of the output depth map includes applying a joint bilateral filter representing two filter kernels including a Gaussian kernel and a range kernel.

20. The method of claim 12, further comprising illuminating the pattern of light on the scene.

21. The method of claim 12, further comprising obtaining the image data.

22. The method of claim 12, wherein converting the second image data to a second depth map comprises:
estimating the second depth map using an unseparated global component of reflected light for the low intensity light areas.

23. At least one non-transitory computer-readable storage medium having instructions encoded thereon that, when executed by at least one processor, cause the at least one processor to perform a method comprising:
obtaining image data of a scene being representative of a time of flight measurement of light reflected from the scene, wherein the image data is based on a pattern of light being illuminated on the scene, wherein the pattern of light includes high intensity light areas and low intensity light areas;
obtaining, based on the image data, first image data being representative of the high intensity light areas;
obtaining, based on the image data, second image data being representative of the low intensity light areas;
estimating direct component image data based on the first image data and the second image data; and
generating an output depth map of the scene based on the direct component image data and the second image data, comprising:
converting the direct component image data to a first depth map;
converting the second image data to a second depth map, the second depth map having a higher resolution than the first depth map; and
using the first depth map and the second depth map to generate the output depth map.

24. The at least one non-transitory computer-readable storage medium of claim 23, wherein converting the second image data to a second depth map comprises:
estimating the second depth map using an unseparated global component of reflected light for the low intensity light areas.

* * * * *